United States Patent Office 2,793,974
Patented May 28, 1957

2,793,974

STREPTOMYCIN COMPOSITION AND COMBATTING PLANT PATHOGENS THEREWITH

Walter G. Rosen and Folke Skoog, Madison, Wis., assignors to Wisconsin Alumni Research Foundation, Madison, Wis., a corporation of Wisconsin No Drawing. Application September 10, 1954, Serial No. 455,350

6 Claims. (Cl. 167—30)

The present invention relates to a new composition of matter having particular utility in the agricultural chemical field. More specifically the invention is directed to a composition comprising as its essential ingredients streptomycin in combination with a water soluble salt of manganese.

The use of the antibiotic streptomycin in the plant field for the treatment of bacterial blights, e. g., fire blight of peach, bean and pear, has been reported. This work has demonstrated that streptomycin can be used successfully for combatting certain plant pathogens. The use of streptomycin, however, in this field has been limited due to its toxic effects resulting in serious plant growth inhibition and bleaching. In the higher plants growth inhibition includes inhibition of leaf expansion, of root growth and of stem elongation. See Rosen, W. G., Ohio J. Sci. 54, 73–78 (1954); Rosen, W. G., Proceedings of the Society for Experimental Biology and Medicine, 85, 385–388 (1954).

In the attempts to overcome plant growth inhibition and bleaching by streptomycin various chemicals and combination of chemicals were tried. None of them proved satisfactory until salts of manganese were tried. The manganese salts when used even in relatively small amounts were found to stimulate growth in the absence of streptomycin and to counteract or prevent growth inhibition in the presence of streptomycin. The effect of the manganese salts was also found to be greater in the presence of streptomycin than in the absence of streptomycin. Tests also have demonstrated that the manganese tends to counteract bleaching. In addition, tests have demonstrated that the presence of the manganese salts has no or relatively slight effect on the desired activity of streptomycin on the plant pathogens.

The manganese salts should be water soluble and substantially non-toxic, the preferred salts being manganous chloride or sulfate. Manganic salts can be employed although they generally break down in the presence of water to yield the stable $Mn^{++}$ ion. Organic salts, e. g., citrate, acetate, etc., can also be employed although it is generally preferred to employ the substantially non-toxic, relatively inexpensive inorganic salts noted above.

The salts should be applied with the streptomycin or at substantially the same time that the streptomycin is applied to the plants. As two separate applications materially increases operation costs, it is preferred to apply a mixture of the streptomycin and manganese salt. This can be done by dusting with or without inert carriers or by aqueous sprays of solutions or emulsions with or without wetting agents such as Tween-20 or the like.

The streptomycin employed in the present invention can be any of the commercially available streptomycins including dihydrostreptomycin. Advantageously, the streptomycin can be used in the form of its water soluble salt, e. g., the chloride salt or sulfate salt, a form readily available on the open market. The amount of streptomycin and manganese salt employed can vary depending upon the particular use, optimum amounts for a particular purpose being readily ascertained by preliminary investigation. Ordinarily it is preferred to employ the streptomycin and manganese salt in about the general range of about equal (wt.) amounts. The following examples will serve to illustrate the invention.

Example I 1000 mg. streptomycin chloride
625 mg. manganous chloride

The ingredients are dissolved in sufficient water to make one liter of solution. In a series of tests with Avena coleoptile sections where 1000 mg./l of streptomycin salt gave only 16 percent normal growth (i. e. 84 percent inhibition of growth), the solution of Example I containing 1000 mg./l. of streptomycin salt and about 275 mg./l of $Mn^{++}$ gave 90 percent normal growth. With effective but somewhat smaller amounts of streptomycin salt (see Example II) and where the normal growth was only 19 percent (i. e. 81 percent growth inhibition), the manganese salt restored the normal growth to 100 percent (i. e. zero inhibition).

Example II 100 mg. streptomycin chloride
125 mg. manganous chloride

The ingredients are dissolved in sufficient water to make one liter of solution. This solution contains 55 mg./l. of $Mn^{++}$.

Example III 100 grams streptomycin sulfate
100 grams manganous sulfate

The ingredients are first dissolved in a small amount of water with or without a wetting agent. Before use this concentrate is further diluted with water to provide a final solution containing about 100 to 1000 mg. of streptomycin salt per liter. Dusting preparations can be prepared in a like manner by mixing the streptomycin salt and manganese salt in inert diluents e. g. talc and the like, of the type employed in agricultural chemical field.

While the use of about equal amounts of streptomycin salt and manganese salt have been found to be within the preferred range, the ratio can vary as indicated by the above examples. It is preferred to keep the weight ratio of $Mn^{++}$/streptomycin salt within the range of about 0.1 to 1.0 and preferably, in most instances, within the range of 0.2 to 0.6. The use of excess manganese salt over and above that required to reduce the toxicity of streptomycin and to counteract growth inhibition and bleaching should be avoided. Also, the use of excess streptomycin over and above that required to control the plant pathogens should be avoided. Optimum ratios of ingredients and final concentrations to be employed for particular purposes can be readily ascertained by preliminary tests.

It is claimed:

1. An agricultural chemical composition for use in combatting bacterial plant pathogens consisting essentially of a streptomycin salt and a substantially non-toxic, water-soluble manganous salt carried in an inert agricultural chemical diluent, said composition containing about 100 to 1000 mg. of streptomycin salt per liter and the weight ratio of $Mn^{++}$/streptomycin salt being within the range of about 0.1 to 1.0.

2. A composition in accordance with claim 1 containing about equal amounts of streptomycin salt and manganous chloride.

3. A composition in accordance with claim 1 containing about equal amounts of streptomycin salt and manganous sulfate.

4. An agricultural chemical composition for use in combatting bacterial plant pathogens consisting essentially of an aqueous solution of streptomycin chloride and manganous chloride, said solution containing about 100 to 1000 mg. of streptomycin salt per liter and the weight ratio of $Mn^{++}$/streptomycin being within the range of about 0.2 to 0.6.

5. An agricultural chemical composition for use in combatting bacterial plant pathogens consisting essentially of an aqueous solution of streptomycin sulfate and manganous sulfate, said solution containing about 100 to 1000 mg. of streptomycin salt per liter and the weight ratio of $Mn^{++}$/streptomycin being within the range of about 0.2 to 0.6.

6. A method of combatting bacterial plant pathogens with a streptomycin salt and counteracting the growth inhibition and the bleaching of the plants caused by streptomycin which comprises treating the plants with a composition consisting essentially of the streptomycin salt and a water-soluble, substantially non-toxic manganous salt in an agricultural chemical carrier, said composition containing about 100 to 1000 mg. of streptomycin salt per liter and the weight ratio of $Mn^{++}$/streptomycin being within the range of about 0.1 to 1.0.

References Cited in the file of this patent

FOREIGN PATENTS 696,886    Great Britain _____ Sept. 9, 1953

OTHER REFERENCES

Waksman: "Streptomycin" publ. 1949 by Williams & Wilkins Co., 1949, p. 21.

Bulletin 275, March 1951, Storrs Agricultural Experiment Station College of Agriculture, U. of Conn., Storrs, Conn., pp. 11–13.

Reynolds et al.: "Antibiotics and Chemotherapy," July 1951, vol. 1, No. 4, p. 268.

Rosen: Proceedings Soc. Exp. Biol. and Med., March 1954, pp. 385–388.